United States Patent [19]
Appleberry

[11] Patent Number: 5,131,706
[45] Date of Patent: Jul. 21, 1992

[54] STRAIGHT LINE GRIPPER TOOL AND CHANGER

[75] Inventor: Walter T. Appleberry, Long Beach, Calif.

[73] Assignee: Rockwell International Corporation, Seal Beach, Calif.

[21] Appl. No.: 724,052

[22] Filed: Jul. 1, 1991

[51] Int. Cl.⁵ .................................. B23Q 3/155
[52] U.S. Cl. ........................... 294/119.1; 901/41; 294/86.4; 483/901
[58] Field of Search .................. 294/119.1, 86.4; 901/41, 36, 37, 38; 29/568

[56] References Cited

U.S. PATENT DOCUMENTS

| | | | |
|---|---|---|---|
| 4,512,709 | 4/1985 | Hennekes et al. | 294/86.4 X |
| 4,636,135 | 1/1987 | Bancon | 294/86.4 X |
| 4,710,093 | 12/1987 | Zimmer et al. | 294/86.4 X |
| 4,793,053 | 12/1988 | Zuccaro et al. | 294/86.4 X |
| 4,993,139 | 2/1991 | Burry et al. | 901/41 X |
| 5,035,566 | 7/1991 | Sartorio et al. | 901/41 X |

Primary Examiner—Margaret A. Focarino
Assistant Examiner—Joseph D. Pape
Attorney, Agent, or Firm—Lawrence N. Ginsberg; Charles T. Silberberg

[57] ABSTRACT

The present invention is a straight line gripper tool and changer assembly, comprising a rotary actuator, a rotary mechanical sequencer, a tool changer, and a tool. The rotary actuator is attachable to a robot arm. The rotary mechanical sequencer is connected to and powered by the rotary actuator providing first and second concentric outputs. A tool changer is driven by the first output for capturing or releasing tools. The tool changer includes a plurality of tool changer clamps. The motion of each tool changer clamp is in a straight line relative to the sequencer. The tool is driven by the second output. The tool comprises at least two end effector clamps for engaging a workpiece. The tool is connected to the tool changer. The motion of each end effector clamp is maintained in a straight line relative to the tool and changer.

11 Claims, 4 Drawing Sheets

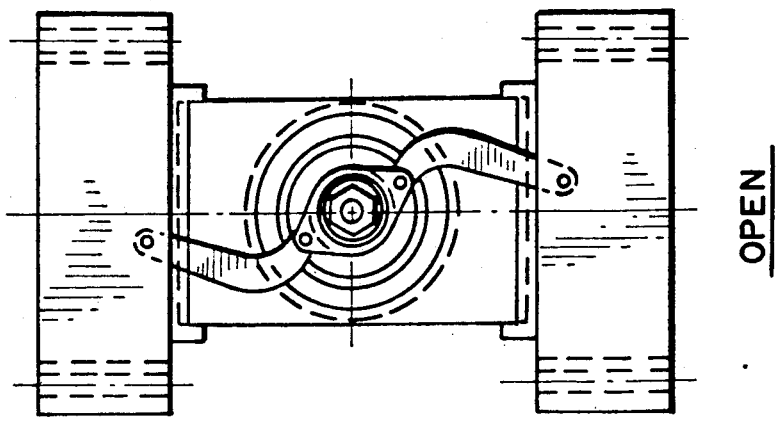
FIG. 3b OPEN
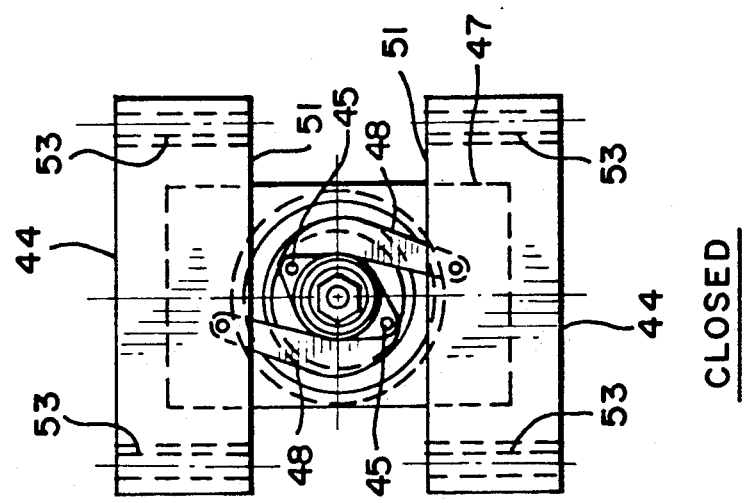
FIG. 3a CLOSED
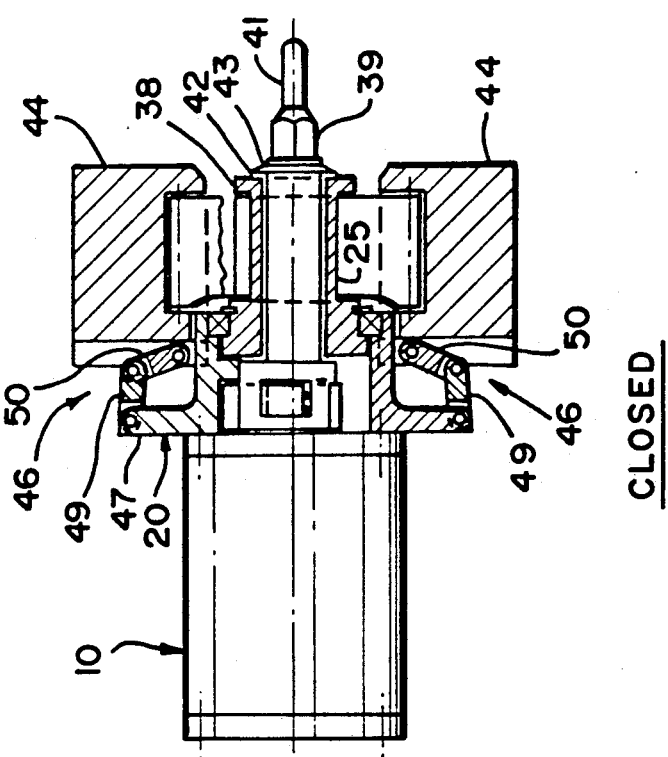
FIG. 3 CLOSED

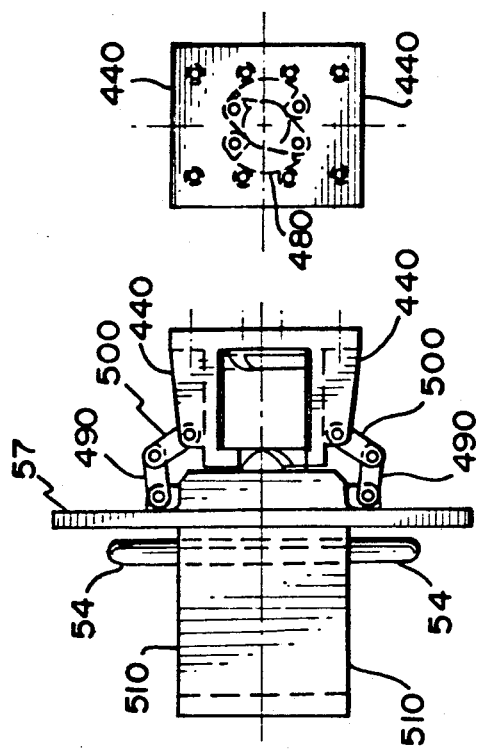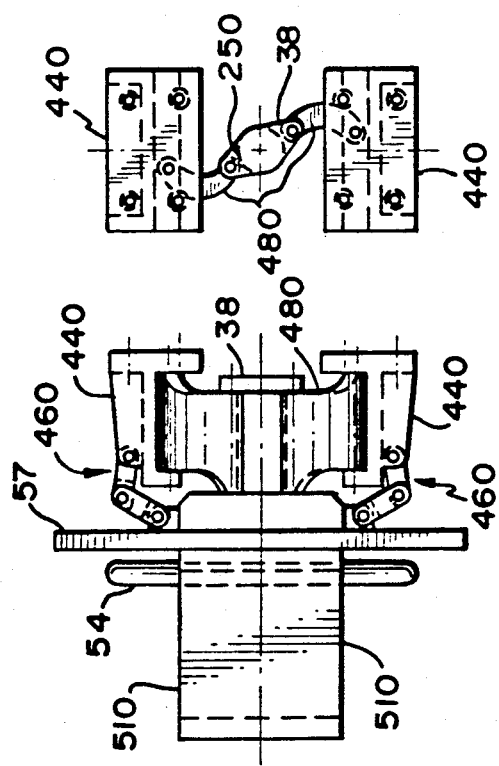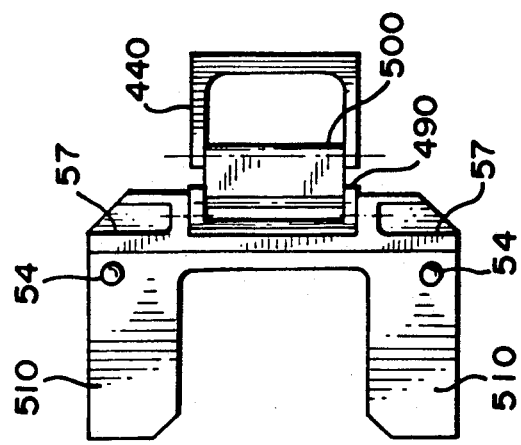

STRAIGHT LINE GRIPPER TOOL AND CHANGER

BACKGROUND OF THE INVENTION

1. Field of the Invention

The present invention relates to robot end effectors and more particularly to a gripper tool and changer which provide straight line motion.

2. Description of the Related Art

The most common robot end effector is the gripper used for pick-and-place operations. To minimize cost, pivoting links are used to produce either ordinary angular motion (as with pliers) or parallelogram motion in which the gripper faces remain parallel but move through an arc. For about a 50% higher price, a straight line sliding gripper is widely available that, besides adding the obvious advantage of gripping with parallel faces, also improves the accuracy of pick-and-place operations and, furthermore, simplifies robot programming by deleting the arc component of gripper travel. In addition to higher cost, however, the sliding gripper is also penalized by substantially higher friction.

There is a need to reduce the cost of straight line robot grippers. As will be disclosed below, the present invention offers an opportunity for such cost reduction.

A further problem related to robot grippers is seen in the methods currently used to change from one gripper type to another. This capability is a major element of the robot market, since tool change is clearly preferred over additional robots. Also, tool changes require down time and, therefore, should be done quickly. Current methods range from manual (slow) to automatic. A significant problem with these methods is that most gripper tools contain their own dedicated actuator, easily the most costly element. The current approach to straight line grippers usually requires one or two actuators, plus synchronizing means for the equal and opposite motions.

There is a need to simplify the present approach to automatic robot tool changing, particularly by use of a passive tool that would eliminate the need for dedicated actuators.

SUMMARY OF THE INVENTION

The present invention is a straight line gripper tool and changer assembly comprising a rotary actuator, a rotary mechanical sequencer, a tool changer, and a tool. The rotary actuator is attachable to a robot arm. The rotary mechanical sequencer is connected to and powered by the rotary actuator providing first and second concentric outputs. A tool changer is driven by the first output for capturing or releasing tools. The tool changer includes a plurality of tool changer clamps. The motion of each tool changer clamp is in a straight line relative to the sequencer. The tool is driven by the second output. The tool comprises at least two end effector clamps for engaging a workpiece. The tool is connected to the tool changer. The motion of each end effector clamp is maintained in a straight line relative to the tool and changer.

The present invention provides the following principal advantages over the prior art:

1. Straight line motion for the gripper tool and tool changer is provided by low friction, low cost pivoting links, rather than the high friction, high cost sliding elements currently used.

2. Only a single rotary actuator is required; no separate dedicated actuator is needed in the exchangeable gripper tool. The actuator is part of the basic tool changer assembly that remains with the robot.

3. The tool changer assembly is kinematically identical to the tool, and could, itself, be used as a gripper tool, should the need arise.

4. Control and coordination of the equal and opposite motion of the gripper tool and tool changer platform is symbiotic in that two of the pivoting links required for straight line motion also provide the coordination for equal and opposite travel of the platforms. These are the two links, curved to maximize stroke, that connect the platform to the two-ended crank of the central drive sleeve.

Other objects, advantages and novel features of the present invention will become apparent from the following detailed description of the invention when considered in conjunction with the accompanying drawings.

BRIEF DESCRIPTION OF THE DRAWINGS

FIG. 3 is the side view of the tool changer, including the sequencer and rotary actuator, oriented as in FIG. 1.

FIG. 3a is an end view of the FIG. 3 embodiment, showing the tool changer in the closed position.

FIG. 3b is another end view of the FIG. 3 embodiment, with the tool changer shown in the open position.

FIG. 4 illustrates the gripper tool in the open position but does not include custom made fingers that are normally provided by the robot user and which are bolted to the clamp fittings shown in the figure, using mounting holes provided.

FIG. 4a is a side view of FIG. 4, the most prominent feature being the U-shaped base, the legs of which provide the optional umbilical interface with the tool changer in FIG. 3.

FIG. 4b is a partial end view of FIG. 4.

FIG. 4c is the same as FIG. 4, except that the gripper tool is shown in the closed position.

FIG. 4d is an end view of FIG. 4c.

The same elements or parts throughout the Figures of the drawings are designated by the same reference characters.

DETAILED DESCRIPTION OF THE PREFERRED EMBODIMENTS

Figure 1C:
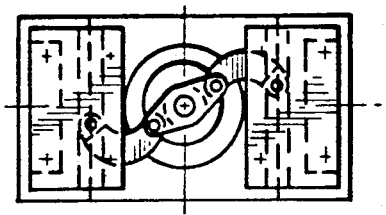
FIG. 1c is another end view of the FIG. 1 embodiment, but does not include umbilical provisions.
Figure 1B:
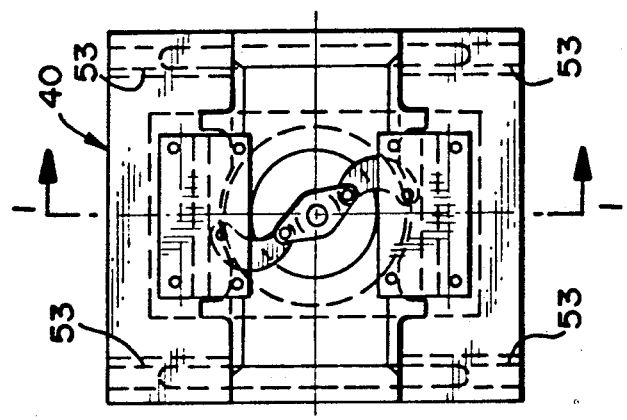
FIG. 1b is an end view of the FIG. 1 embodiment, shown along line 1b—1b of FIG. 1, looking toward the robot.
Figure 1:
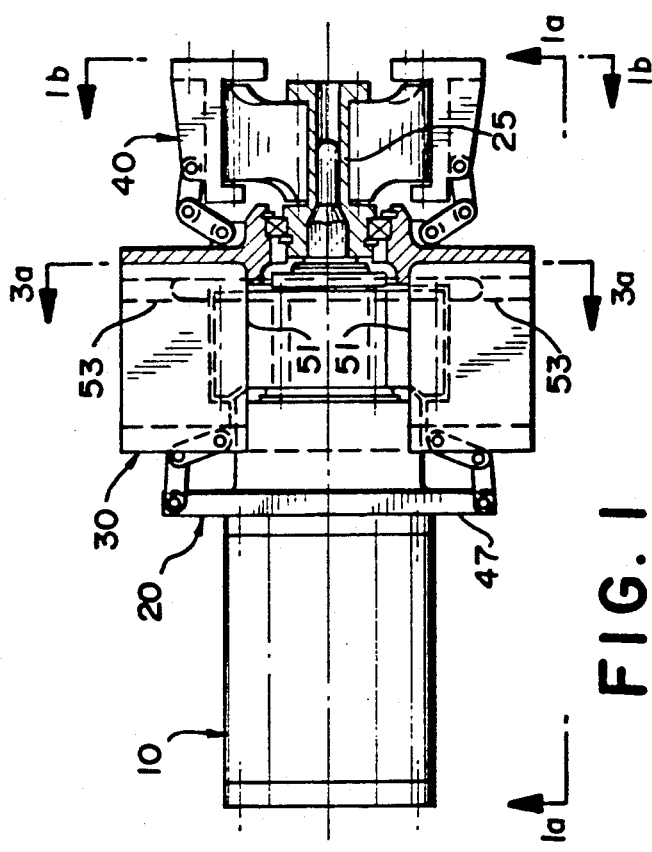
FIG. 1 is a top view of the straight line gripper tool and changer assembly of the present invention, shown in partial cross section.

Referring to the drawings and the characters of reference marked thereon, FIG. 1 shows the entire robot tool and tool changer assembly, comprising four major components: a conventional rotary actuator 10, a rotary mechanical sequencer 20, a tool changer 30, and a tool 40. These major components are positioned serially along the central axis of the assembly. The tool 40, illustrated in this figure, is of the gripper type, used for pick-and-place operations, and is probably the tool most often used with respect to the present invention. However, other end effectors may be used, such as welding or painting tools. Thus, the specific tool is shown for the purposes of illustration and not limitation.

Figure 1A:
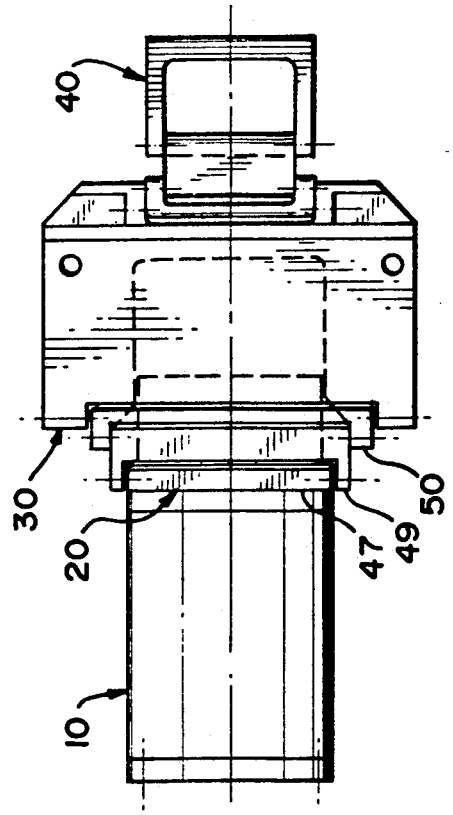
FIG. 1a is a side view of the FIG. 1 embodiment, shown along line 1a—1a of FIG. 1.

A conventional pneumatic hydraulic or electromechanical rotary actuator 10 may be utilized. In the example shown, +301 degrees of rotation are provided. FIG. 1a is a side view of FIG. 1 and FIG. 1b is an end view of FIG. 1. Both of these figures will be discussed further in the foregoing detailed descriptions of the sequencer 20, tool changer 30, and gripper tool 40.

FIG. 1c is another end view of the FIG. 1 embodiment but does not include umbilical provisions. These are not required if only simple pick-and-place operations are needed. A key reason for this is that the present invention uses only one rotary actuator operating through a rotary dual output mechanical sequencer that provides sequential torque to both the tool changer and the tool itself. The tool is passive, having no actuator of its own. During the entirely automatic tool exchange cycle, the passive tool is retrieved from storage, captured by the tool changer, which provides torque to the tool from the sequencer then stows the tool when desired. Deleting the umbilical markedly reduces the gripper size, as shown in the figure, and its cost.

Rotary Mechanical Sequencer

Figure 2:
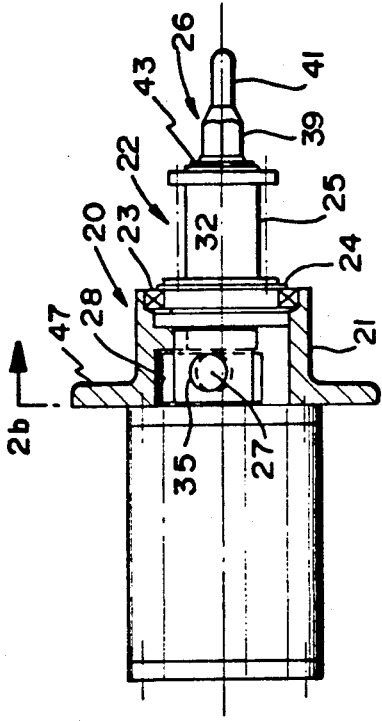
FIG. 2 is a side view of the rotary actuator and mechanical sequencer of the present invention, including a sequencing ball element.

Referring now to FIG. 2, a side view of the sequencer 20 and the rotary actuator 10 is shown. The sequencer housing 21 is shown in cross section, thereby exposing the rotatable core assembly, designated generally as 22. The core 22 is attached to the housing 21 by means of an anti-friction bearing 23, pressed into the housing and positioned on the core assembly 22 by means of a retaining ring 24. The core assembly 22 consists of two coaxial elements, an outer sleeve 25, and an inner spindle 26.

Relative rotary motion between the sleeve 25 and spindle 26 is controlled by the interaction of three elements: two balls 27 (one in sleeve 25 and the other in the spindle 26), and a crank fitting 28. The crank fitting 28 is integral with, and is driven by the rotary actuator 10, and the sequencer is controlled by the notch shapes machined in the housing 21 and the crank 28. These shapes or recesses are best seen in FIG. 2b, and consist of two identical recesses, 29 and 31, symmetrically disposed about a mechanical stop 32. The core assembly is further detailed in FIG. 2a, which also shows a rectangular hole 33 for use with rollers 34, as an option to the round hole 35 and balls 27, shown in FIG. 2. The holes are also shown in FIG. 2b, whether round or rectangular. The mechanical stop 32 interfaces only with the core assembly elements 25 and 26, allowing the actuator crank 28 to pass.

Figure 2A:
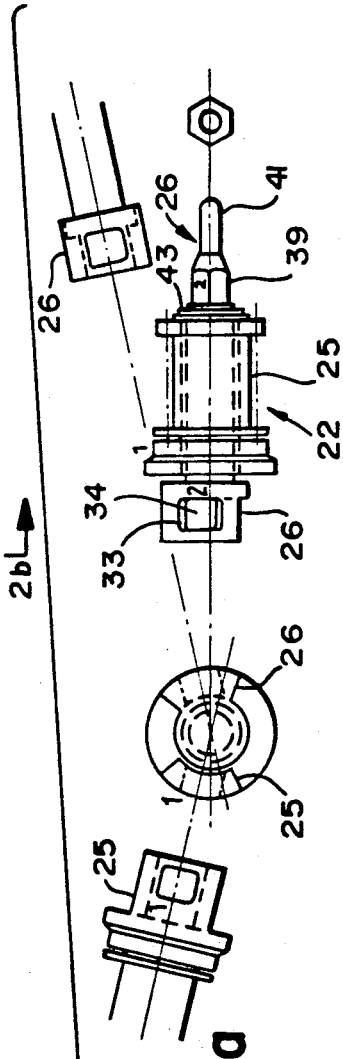
FIG. 2a is a side view of the sequencer, positioned as in FIG. 2, showing only the moving parts. Also shown is an optional roller sequencing element, which requires a rectangular hole in its retainer fitting.
Figure 2B:
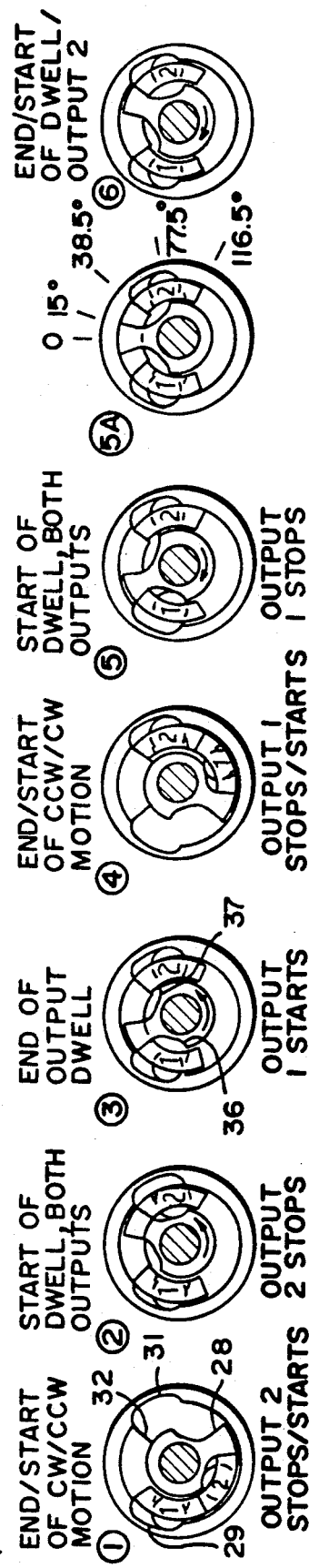
FIG. 2b includes end views of the sequencer, looking from the actuator interface, and showing seven key sequencer positions as the sequencer rotates through a full cycle (+301 degrees).

FIG. 2a shows the sequencer core assembly 22. Each of the two major core elements, sleeve 25 and spindle 26, consists of first and second terminal portions. For both, their first terminal portion includes either a round hole 35 or the optional rectangular hole 33, shown in the figure. Each first terminal portion thereby forms a cage containing either a ball 27 or roller 34, such that the ball (or roller) can move radially through the hole, outwardly to engage recesses 29 or 31 in the housing 21, and inwardly to engage recesses 36 or 37 in the crank 28. These crank recesses can be best seen in FIG. 2b.

The second terminal portion of sleeve 25, forms a two-ended crank 38, that can be seen in FIG. 1b. The second terminal portion of spindle 26 includes a hexagon shape 39 which extends beyond the two-ended crank 38. Extending beyond the hexagonal portion 39 of the spindle 26 is an integral round probe 41, as shown in FIG. 2a. This spindle extension 41 is inserted into a hexagonal hole in the gripper tool 40 and thereby provides means for transmitting relative torque to the tool. This drive engagement is shown in FIG. 1.

At both ends of their rotatable cylindrical interface, the sleeve 25 and spindle 26 are separated by identical anti-friction shoulder bushings 42, best seen in FIG. 3. The spindle 26 is captured in sleeve 25 at their second terminal portions by a retaining ring 43, as also best seen in FIG. 3.

FIG. 2b illustrates the rotary sequencer cycle end and how the actuator crank 28 moves the two outputs in cooperation with the balls (or rollers). Seven numbered phases are shown, beginning with the crank at the fully clockwise (CW) position (tool changer and tool are closed). When moving the crank counterclockwise (CCW), output 2 is constrained to move with it because they are latched together by the roller 34 which is caught in the crank recess 37. This constraint holds until phase 2 is reached, which allows the roller to move outward into the housing recess 31, meaning the tool 40 is fully opened.

The crank may be operated CW or CCW in the region between phases 1 and 2, closing or opening the tool as needed, while the tool changer 30 is safely locked in the closed position. Continued CCW crank motion beyond phase 2, moves the output roller 34 into the housing recess 37, thereby allowing the crank to move under the roller and latching output 2 to the housing 21. At the same time that the output 2 stops, the crank enters a dwell period in which it continues to move while both outputs are locked. The dwell shown in 47 degrees. In practice, however, these phase points will be spaced so as to preclude the transition effects occurring while the ball moves radially between recesses. It is a simple matter to program the actuator motor controller in a way that avoids operational use in these areas which could cause minor shock or acceleration transients.

The end of the dwell period is reached at phase 3, where contact is made between the crank and output 1. Continued CCW crank movements sets output 1 into motion, by allowing the output 1 roller to move inward from the housing recess 29 into the crank recess 36, thereby latching the two as they move together. When they reach phase 4, the crank has reached its fully CCW position, and all motion stops, meaning the tool changer 30 is open and the robot can deposit the tool in a tool holder, move to the next tool, and capture it in the tool changer, all automatically.

Tool Changer

FIG. 3 shows the tool changer 30 in the closed position but without a tool 40, as seen along the z axis of an orthogonal cartesian coordinate system in which the principle longitudinal axis of the entire 4-element invention is the x axis. The y axis lies in the plane of platform motion, and the z axis is perpendicular to the x and y axes. FIG. 3 also includes the sequencer 20 and rotary actuator 10. The tool changer consists of two platforms 44 that move toward and away from each other in a straight line and in equal and opposite directions. This straight line motion and coordination of equal and opposite travel is produced and controlled by the interaction of two tool changer link assemblies, designated generally as 46 and 60, one at each platform.

Each of the two tool changer link assemblies 46 and 60 is identical to the other and each is generically of the six-bar class, which includes the platform (or tool changer clamp) 44, the base 47 (provided by the sequencer housing 20), the two-ended sequencer crank 38, drive link 48, and coupled links 49 and 50. Straight line motion of each tool changer clamp 44 relative to the base 47 (i.e. sequencer housing 20) is provided in accordance with the principles set forth in the patent application Ser. No. 07/724,051 entitled "Straight Line Mechanism", by the present inventor, Walter T. Appleberry, filed concurrently herewith, and incorporated by reference herein.

The curved drive link 48, having pivoting means at first and second ends is attached at its first end to the sequencer sleeve, 25 (output 1) and, more particularly, positioned to mate with one of the two pivot means 45 provided by the two-ended crank 38, as shown in FIGS. 3a and 3b. The second end of the drive link 48 is pivotally attached to the platform 44. Both pivot axes of the curved drive link are parallel to the x axis, and thereby constrain the link to movement in the y-z plane. The two remaining links, 49 and 50, each having first and second ends containing pivot means, are pivotally attached to each other at their first ends. The second end of link 50 is pivotally attached to platform 44 and the second end of link 49 is pivotally attached to flange 47 of sequencer housing 21.

The three pivot axes of the link pair, 49 and 50, are parallel to the z-axis, which allows the pair to move only in the x-y plane. This plane is perpendicular to the y-z plane in which the curved drive link 48 moves. This kinematic condition thereby constrains the tool changer clamps 44 to move along a line that is parallel to the intersect line of the two planes, which is parallel to the y-axis. This also defines straight line motion.

Although straight line motion and equal and opposite travel coordination can be obtained by the interaction of two generic six-bar linkages (one at each platform) both use a common base and a common sequencer-driven crank. Therefore, there are only 10 generic links shown, rather than 12.

Referring now to FIGS. 3a and 3b, the tool changer 30 is shown looking along the x-axis, in the closed and open positions, respectively. The drive links 48 are curved in order to accommodate a larger stroke (120 degrees shown) without interference between the links and the sequencer output sleeve 25. The gap between the closed platforms 44 accommodates the gripper tool 40. Surfaces 51 of the platforms form two optional umbilical interfaces with the tool 40 in the x-z plane for transfer of fluids and electrical signals and power, if required. Connect and disconnect are automatic during the tool exchange cycle. (No umbilical details are shown in these figures.) For precise connector alignment, two holes 53, are provided in each tool changer platform. These mate with two corresponding pins 54 in the gripper tool 40. The pins can best be seen in FIGS. 4 and 4c.

As noted above, however, umbilical provisions are not required for the simple gripper tool 40 used in pick-and-place operations or for any tool that can be powered by the central rotary input available from the sequencer output of the present invention.

In operational use, the fully automatic tool exchange cycle starts by positioning a captive tool 40 in its storage rack, under robot control. The sequencer 20 then cycles fully counterclockwise, first opening the tool, then the tool changer 30, thereby releasing the tool so that the tool changer can be withdrawn. The robot moves the tool changer to the storage location of the desired tool, performing the above steps in reverse order. The changer moves toward the tool, the sequencer probe first entering the tool socket, and then the sequencer cycles clockwise to at least mid-stroke, to capture the tool.

Gripper Tool

FIG. 4 is a view of the gripper tool 40, looking along the z-axis. It is kinematically identical to the tool changer 30. Thus, their similarities will be summarized and their differences detailed. Similar parts will be identified by a 3-digit number ending in zero, the first two digits of which are the same as the corresponding tool changeR part number.

In summary, the gripper tool 40 consists of two platforms or end effector clamps 440, that move along a common straight line in equal and opposite directions, controlled by two end effector link assemblies 460 of the six-bar class. These include the platforms 440, the tool base 470, a drive sleeve 250, with a two-ended crank 380, two curved drive links 480, and couple links 490 and 500 forming a link pair at each platform. A final similarity is the umbilical interfaces 510.

FIG. 4b is an end view of FIG. 4, but shows only the moving parts: a two-ended crank 380, that is part of the central drive sleeve 250; two curved end effector drive links 480; and, two platforms 440.

The end of the drive sleeve 250, that mates with the sequencer drive spindle 26, includes a hexagonal socket 55 that provides a close mating fit with the sequencer spindle hexagonal portion 39, as best seen in FIG. 1. The tool drive sleeve 250, further includes a round hole 56 that extends from the hexagonal socket through the opposite end of the sleeve. Hole 56 is sized to provide a close mating fit with the sequencer spindle round probe 41.

FIG. 4a is a side view of FIG. 4 and shows the umbilical surface 510, and two alignment pins 54, which slidably engage mating holes 53 in the tool changer 30. This engagement can be seen in FIGS. 1 and 1b. These pins initiate engagement prior to contact between umbilical connectors to insure precise alignment, also to facilitate placement of the tool changer 30 on the tool 40, the tool base includes a flange 57 that extends beyond the alignment pins 54, as shown in FIGS. 4 and 4c. To further facilitate this placement, the opening in the tool changer is only slightly more than the length of pins 54. These provisions, plus lead-in bevels, chamfers, or other means well known to those skilled in the art, will provide reliable mating and capture the tool by the tool changer.

The holes 58 in the outer surface 59 of platforms 440 are for bolting commercially available or custom made fingers (not shown) to suit the robot user. These fingers provide direct interface between the robot tool 40 and the payload.

When not in use, a tool may be automatically stowed in a storage rack, in such a position (generally opened) as to facilitate automatic pick up by the robot and its tool changer.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A straight line gripper tool and changer assembly, comprising:
   a) a rotary actuator attachable to a robot arm;
   b) a rotary mechanical sequencer connected to and powered by said rotary actuator for providing first and second concentric outputs;
   c) a tool changer driven by said first output for capturing or releasing tools, said tool changer including a plurality of tool changer clamps, the motion of each tool changer clamp being in a straight line relative to said sequencer; and
   d) a tool driven by said second output, said tool comprising at least two end effector clamps for engaging a workpiece, said tool connected to said tool changer, the motion of each end effector clamp being in a straight line relative to said tool and changer.

2. The straight line gripper tool and changer assembly of claim 1, wherein said straight line gripper tool and changer assembly includes a main central axis, said rotary actuator, rotary mechanical sequencer, tool changer, and tool being positioned serially along said main central axis.

3. The straight line gripper tool and changer assembly of claim 1, wherein said first output is located concentrically around said second output.

4. The straight line gripper tool and changer assembly of claim 1, including two tool changer clamps, said tool changer clamps being constrained to motion in equal and opposite linear motions, relative to each other.

5. The straight line gripper tool and changer assembly of claim 1, including two end effector clamps, said end effector clamps being constrained to motion in equal and opposite linear motions relative to each other.

6. The straight line gripper tool and changer assembly of claim 1 wherein the straight line motion of each said tool changer clamps is provided by a straight line mechanism, comprising:
   a first tool changer link assembly comprising a first link pivotally connected to a second link, said first link being pivotally connected to said first output of said sequencer, said first tool changer link assembly being so constructed to be constrained to movement in a desired first plane; and,
   a second tool changer link assembly comprising a sequencer crank pivotally connected to a curved drive link, said sequencer crank being rotably connected to said first output of said sequencer, said second tool changer link assembly being so constructed to be constrained to movement in a second plane which is angularly disposed from said first plane,
   said second link of said first link assembly and said curved drive link, each being pivotally attached to said tool changer clamp, the motion of said tool changer clamp being constrained to a straight line having a direction perpendicular to an imaginary line defined by the intersection of said first and second planes.

7. The straight line gripper tool and changer assembly of claim 6, including two tool changer clamps, said tool changer clamps being constrained to motion in equal and opposite linear motions, relative to each other.

8. The straight line gripper tool and changer assembly of claim 1 wherein said tool includes a tool base connected to said tool changer, the straight line motion of each said end effector clamps being provided by a straight line mechanism, comprising:
   a first end effector link assembly comprising a first link pivotally connected to a second link, said first link being pivotally connected to said tool base, said first end effector link assembly being so constructed to be constrained to movement in a desired first plane; and
   a second end effector link assembly comprising a two-ended crank pivotally connected to a curved end effector drive link, said two-ended crank being rotatably connected to said tool base, said second end effector link assembly being so constructed to be constrained to movement in a second plane which is angularly disposed from said first plane,
   said second link of said first link assembly and said curved end effector drive link each being pivotally attached to said end effector clamp, the motion of said end effector clamp being constrained to a straight line having a direction parallel to an imaginary line defined by the intersection of said first and second planes.

9. The straight line gripper tool and changer assembly of claim 8, including two end effector clamps, said end effector clamps being constrained to motion in equal and opposite linear motions relative to each other.

10. The straight line gripper tool of claim 1, wherein said rotary actuator includes an integral crank, said rotary mechanical sequencer, comprising:
    a) a sequencer housing having notches formed therein;
    b) a core assembly rotably contained within said housing, said core assembly comprising an outer sleeve and an inner spindle, said inner spindle being retained within said outer sleeve by a retaining ring, said outer sleeve being contained within said sequencer housing by press fit ball bearing and a second retaining ring, said core assembly further including a plurality of holes formed therethrough; and,
    c) a plurality of rollers engagable in said notches, and in said core assembly holes, such that as said rollers move in a radial direction, they either occupy one of said notches in said sequencer housing or corresponding notches in said crank assembly, said outer sleeve providing one of said outlets while said inner spindle provides the second of said outlets.

11. A rotary sequencer for providing sequencing of two concentric rotary outputs from a rotary actuator having an integral crank, comprising:
    a) a sequencer housing having notches formed therein;
    b) a core assembly rotatably contained within said housing, said core assembly comprising an outer sleeve and an inner spindle, said inner spindle being retained within said outer sleeve by a retaining ring, said outer sleeve being contained within said sequencer housing by press fit ball bearing and a second retaining ring, said core assembly further including a plurality of holes formed therethrough; and, c) a plurality of rollers engagable in said notches, and in said core assembly holes, such that as said rollers move in a radial direction, they either occupy one of said notches in said sequencer housing or corresponding notches in said crank assembly, said outer sleeve providing one of said outputs while said inner spindle provides the second of said outputs.

* * * * *